United States Patent [19]

Karani

[11] Patent Number: 4,771,807

[45] Date of Patent: Sep. 20, 1988

[54] STEPPING ACTUATOR

[75] Inventor: Hans M. Karani, Houston, Tex.

[73] Assignee: Cooper Industries, Inc., Houston, Tex.

[21] Appl. No.: 68,496

[22] Filed: Jul. 1, 1987

[51] Int. Cl.⁴ .................... F16K 31/42; F16K 31/163
[52] U.S. Cl. ............................ 137/553; 251/129.04;
  251/129.05; 251/31; 251/129.03
[58] Field of Search ............... 251/129.04, 129.05,
  251/31, 129.03; 137/553

[56] References Cited

U.S. PATENT DOCUMENTS

| | | | |
|---|---|---|---|
| 2,469,786 | 5/1949 | Rieber | 251/129.04 X |
| 3,153,317 | 10/1964 | Manor et al. | 251/31 X |
| 3,488,030 | 1/1970 | Hulme et al. | 251/129.05 X |
| 4,455,012 | 6/1984 | Gupta | 251/129.05 |

Primary Examiner—Arnold Rosenthal
Attorney, Agent, or Firm—Eddie E. Scott; Alan R. Thiele

[57] ABSTRACT

A valve choke actuating device utilizes a stepping actuator with a feedback control system. A command signal and a feedback signal are compared to produce a train of electrical pulses proportional to the difference in the signals. The train of pulses are utilized to actuate piston-cylinder assemblies to control the opening of the choke.

5 Claims, 6 Drawing Sheets

STEPPING ACTUATOR

BACKGROUND OF THE INVENTION

1. Field of the Invention

This invention relates in general to high pressure actuating devices for chokes and valves and, more particularly, to an automatic choke or valve positioning control system having manual override capability.

2. Background

The invention, a stepping actuator with electromechanical feedback control system, is used for precise positioning of a choke device in a high pressure flowline such as from an oil or gas well.

Various types of choke devices have been used to control the flow rate from a high pressure production line and to reduce the downstream pressure to safe and convenient levels. Provision for remote and manual control is oftentimes desirable and is sometimes provided for such devices. However, the degree of precision control and the reliability of the known devices have been found wanting. In addition, very large devices for providing very large torques have heretofore been necessary.

It is therefore an object of the invention to provide a stepping actuator with a simple gear drive of few parts to minimize backlash and increase control precision.

Another object is to provide a stepping actuator with an electro-mechanical feedback control system with automatic remote control and manual override capabilities.

A further object is to provide a stepping actuator having a gear drive which operates with minimal torque requirements.

SUMMARY OF THE INVENTION

The invention is an actuating device with an associated electro-mechanical control system for automatic and precise positioning control of a choke device in a high pressure flowline. The invention includes a stepper actuator having an actuator stem mechanically fixed to the choke element for positioning the choke element in response to movement of the actuator stem and an electro-mechanical control system for controlling the operation of the stepped actuator. The control system includes a source of electrical command signals, a drive controller for receiving and comparing the command signal with a feedback signal indicative of actual choke element position and delivering a difference signal when there is a deviation from the feedback signal, means for generating a train of On-Off electrical pulses of a number proportional to the magnitude of the difference signal, and controlling the energization of solenoid valves to deliver pulses of fluid pressure from a fluid pressure source to either of a pair of piston-cylinder assemblies in accordance with the positive or negative character of the difference signal, and utilizing the piston of the activated piston-cylinder assembly to activate a gearing assembly for imparting axial rotation of the actuator stem in steps corresponding in number to the number of said pulses until there is a balance between the command and feedback signals, and a mechanical drive means for imparting an increment of axial movement to the choke element for each step of stem rotation to increase or decrease the opening of the choke. The actuator is also provided with means for manual override operation and a remote position indicator.

BRIEF DESCRIPTION OF THE DRAWINGS

In the accompanying drawings which form part of the specification and are to be read in conjunction therewith.

DETAILED DESCRIPTION OF THE DRAWINGS

Figure 1:
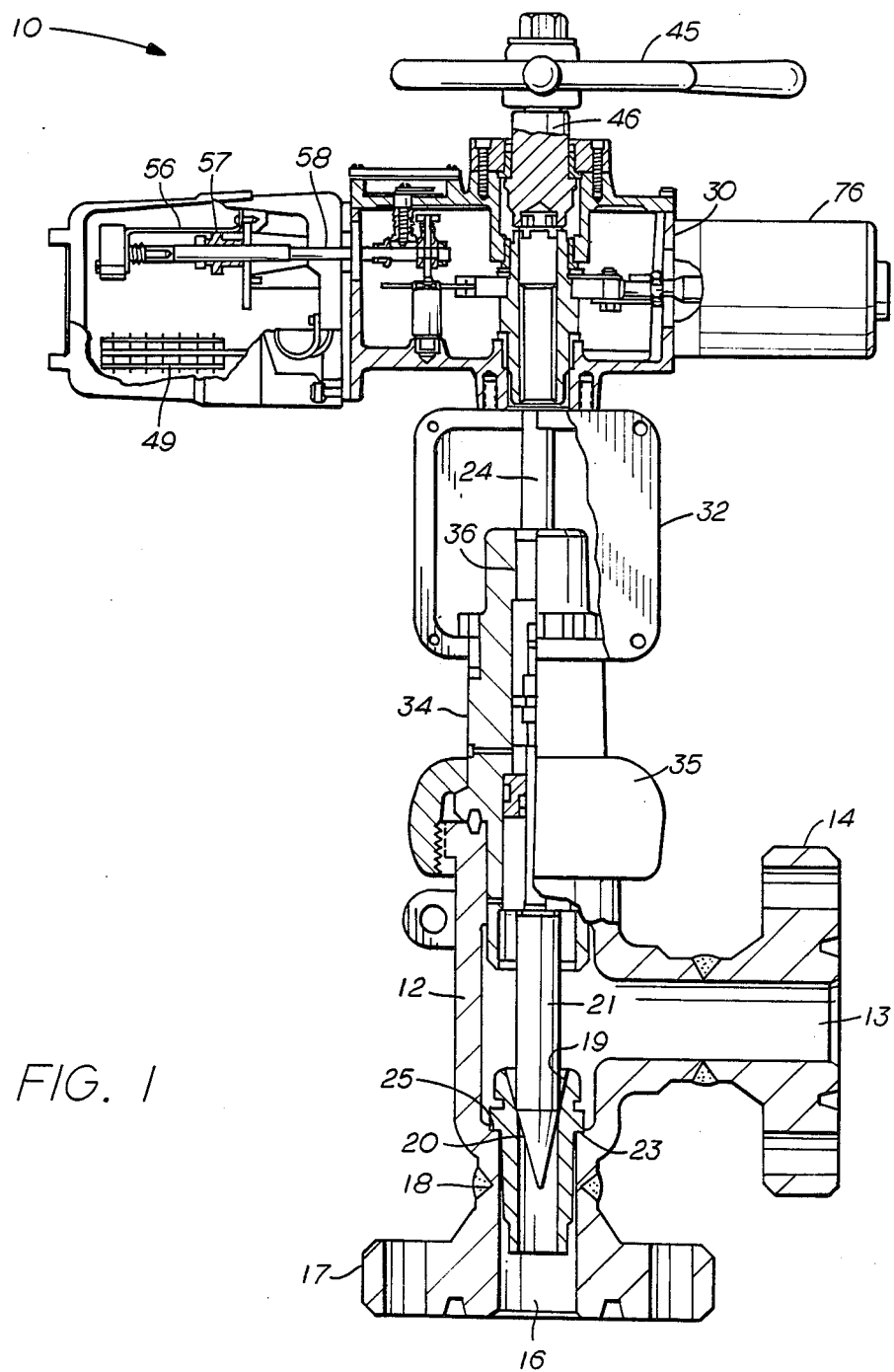
FIG. 1 is a view of a choke suitable for controlling the rate of flow in a high pressure flowline with the stepping actuator assembly and associated control system of the invention mounted thereto with parts of the choke and assembly housings cutaway to shoe details of the invention.
Figure 2:
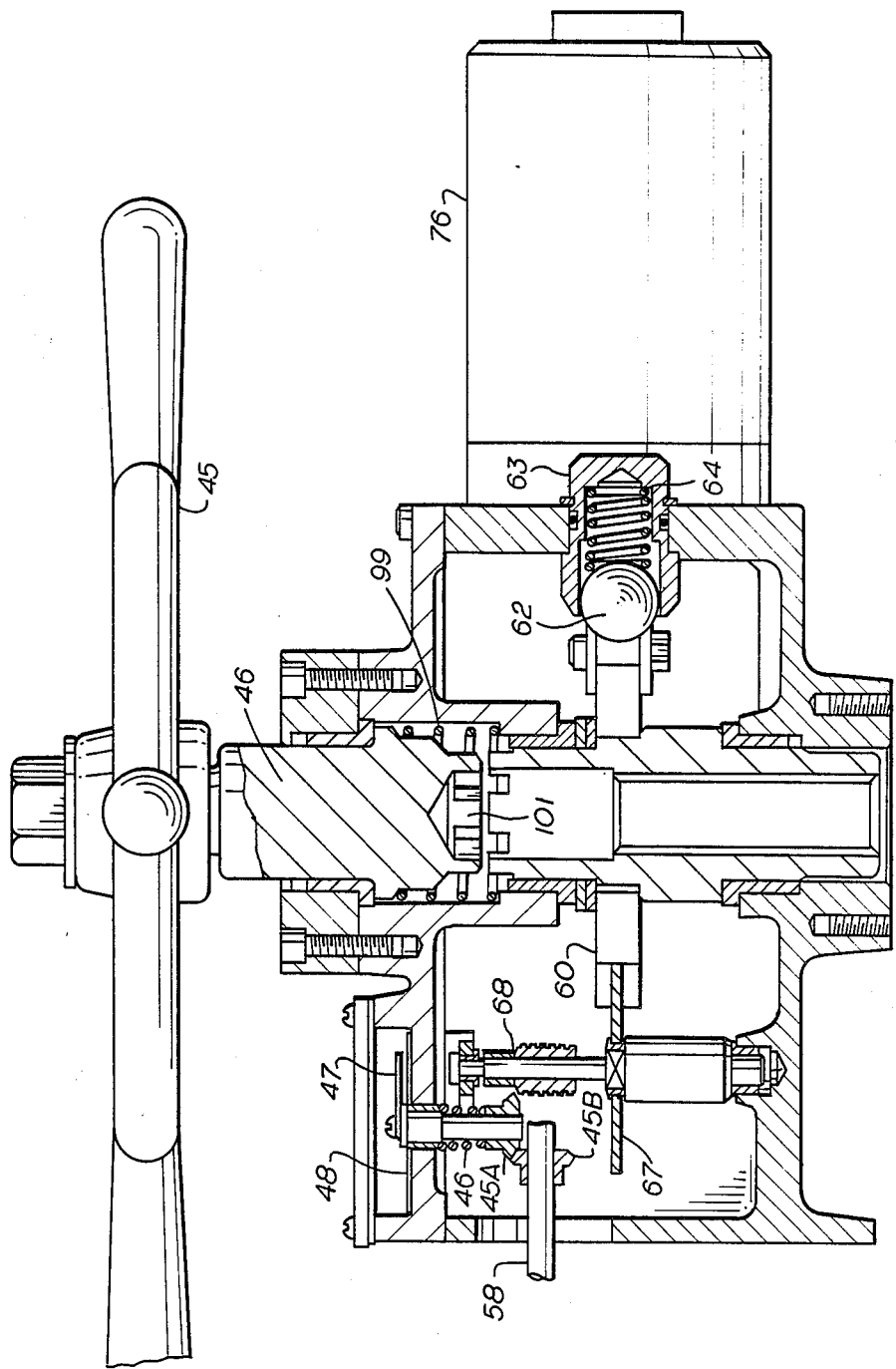
FIG. 2 is an enlarged sectional view of the gear drive assembly of the invention and means for providing for an actuator manual override capability for the invention.

Referring to the drawings in greater detail, a preferred embodiment of the invention shown therein comprises a stepping actuator assembly 10 which is mounted to one end of a choke body 12. The choke body 12 is of a general "T-shape" configuration having "T-shape" flow passage conforming symmetrically with the shape of the choke body. The base of the "T" is provided with an inlet 13 and an annular flange 14 about the opening for facilitating connection of the choke body to a flowline. An outlet 16 is provided in one of the arms of the choke body which also is equipped with an annular flange 17 about the outlet for connection to a downstream flowline. Disposed in the outlet flow passage in the outlet arm of the choke body 12 is a tubular choke seat element 18 having an interior conical seating surface 19 which is adapted to receive the conical shaped end 20 of a choke element 21 mounted in the choke body.

The actuator assembly for controlling position of the choke element 21 includes a segmented actuator stem 24 comprised of a plurality of coaxially aligned stem segments 24a, 24b, 24c as will later be described. The actuator stem segment 24c is affixed to the choke element 21 in coaxial rotation therewith and is adapted to control the position of the choke element 21 relative to the seat 19 mounted in the choke body and thereby control the rate of flow through the choke body from inlet 13 to outlet 16. Preferably, the seat element 18 is threadedly connected to the choke body 12 to facilitate its replacement and is therefore provided with an externally threaded section adapted to threadedly engage internal threads provided in a section of the outlet flow passage 16. An external radial flange 23 of the seat element is adapted to engage an internal annular radial shoulder 25 formed in the choke body to fix the relative position of the seat element in the flow passage 16. The relative position of the conical tip of the choke element 21 to the conical seat surface 19 thereby defines the degree or percent opening of the choke. In the fully closed position, as shown in FIG. 1, the choke element 21 engages the seat 19.

The electro-mechanical feedback control system of this invention is particularly suited for precisely controlling the position of the choke element 21 relative to the seat 19. The system includes the actuator stem 24 which is adapted to be selectively rotated in steps of angular rotation as will hereinafter be described to axially advance the choke element 21 towards the seat 19 or to cause its retraction therefrom. The electro-mechanical system comprises a gear box housing 30 which houses gear drive assemblies of the system and the actuator stem 24 which extends therethrough. A mounting bracket 32 fixes the gear box 30 to a tubular adapter or hub 34 fitted to the choke body 12. The tubular adapter 34 is clamped in coaxial alignment with the outlet flow passage 16 of the choke body 12 by means of a suitable clamp 35. The actuator stem 24 extends through the gear box 30 and the bore of the tubular adapter 34 and is fixed to the end of the choke element 18 in coaxial alignment therewith. As mounted to the adapter 34, axial rotation of the actuator stem causes its axial movement relative to the adapter 34 and the choke body 12. This is accomplished by means of a threaded connection 36 found by external threads on an enlarged external diameter section of the actuator stem segment which are disposed in cooperative engagement with internal threads provided in the bore of the tubular adapter 34. Selective rotation of the actuator stem causes it to be threaded inwardly or outwardly of the choke body to either close or open the choke.

Figure 6:
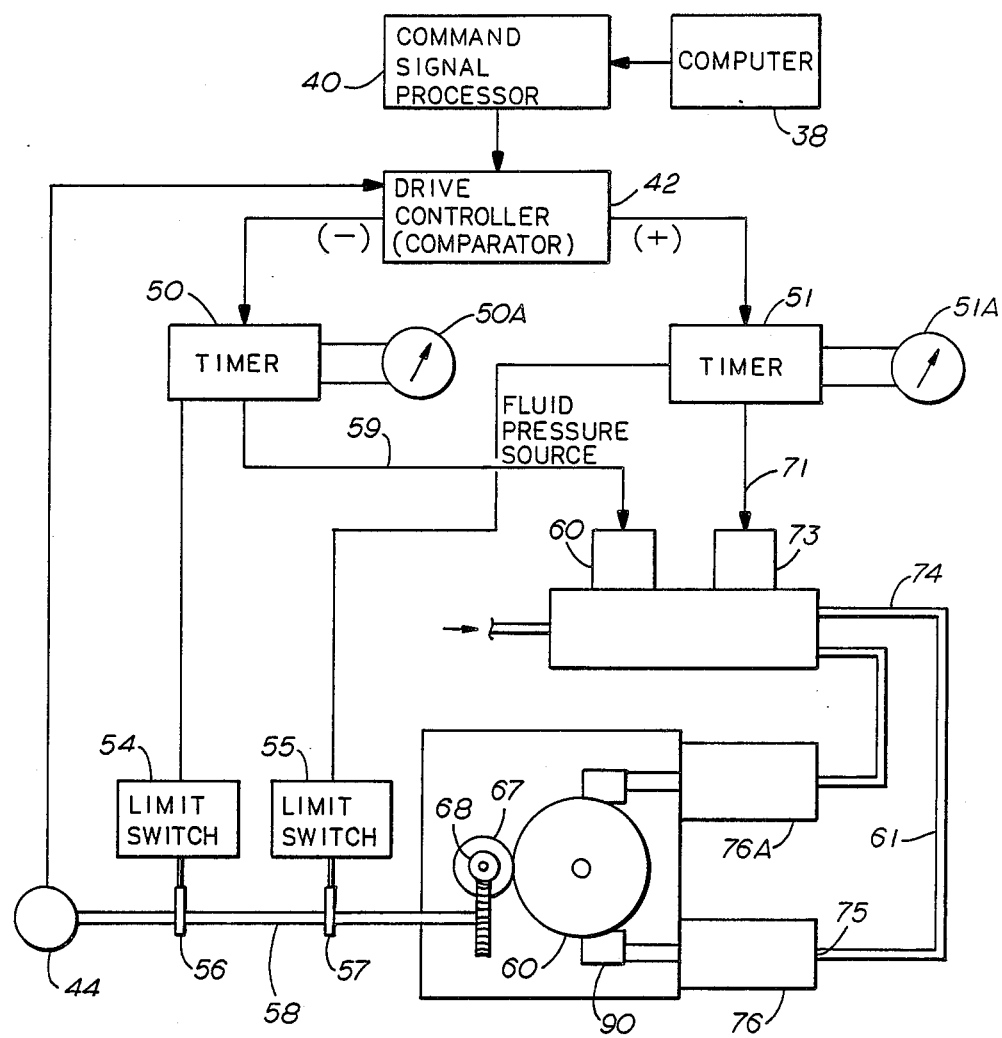

The electro-mechanical feedback control system, as shown schematically in FIG. 6, utilizes a computer 38 coupled to a command signal processor 40 for delivering specific d.c. command signals, in the range of 4 ma to 20 ma, to a drive controller comparator 42. The drive controller also receives an electrical feedback signal from a feedback potentiometer 44 which is mechanically coupled by a gear train to the actuator stem and provides an electrical signal which indicates actual choke position. The sold state positioning drive controller 42 is capable of receiving adc command signal in the range of 0–50 ma or 0–10 volts d.c. from the process controller or computer. The drive controller 42 consists of a comparator (zero detection) circuit and an amplifier whose output is fed to either of a pair of pulse timer circuits 50, 51. The timers 50, 51 are provided with respective rheostats, 50a and 51a, for controlling and adjusting the pulse rate of the associated timer and number of pulses for a given drive controller signal.

A pair of limit switches 54, 55 which are adapted to be actuated by cams 56, 57, respectively, and are electrically coupled to the timers 50, 51, respectively, signal the timers to cease operation at a desired limit of movement of the choke element. The cams 56, 57 are mounted on a shaft 58 in the gear drive assembly.

The output of timer 50, which responds to a signal for decreasing the choke opening, is delivered via conductor 59 to a solenoid valve 60 which is repeatedly energized by each of the "on" pulses of the pulse train to repeatedly open the valve and establish communication between a source of fluid pressure and a piston-cylinder assembly 76A via a conduit 61 whenever the solenoid valve 60 is energized.

The output of timer 51 is delivered by means of conductor 71 to the solenoid valve 73 which, in similar fashion, communicates the fluid pressure source with the piston-cylinder assembly 76.

Figure 3:
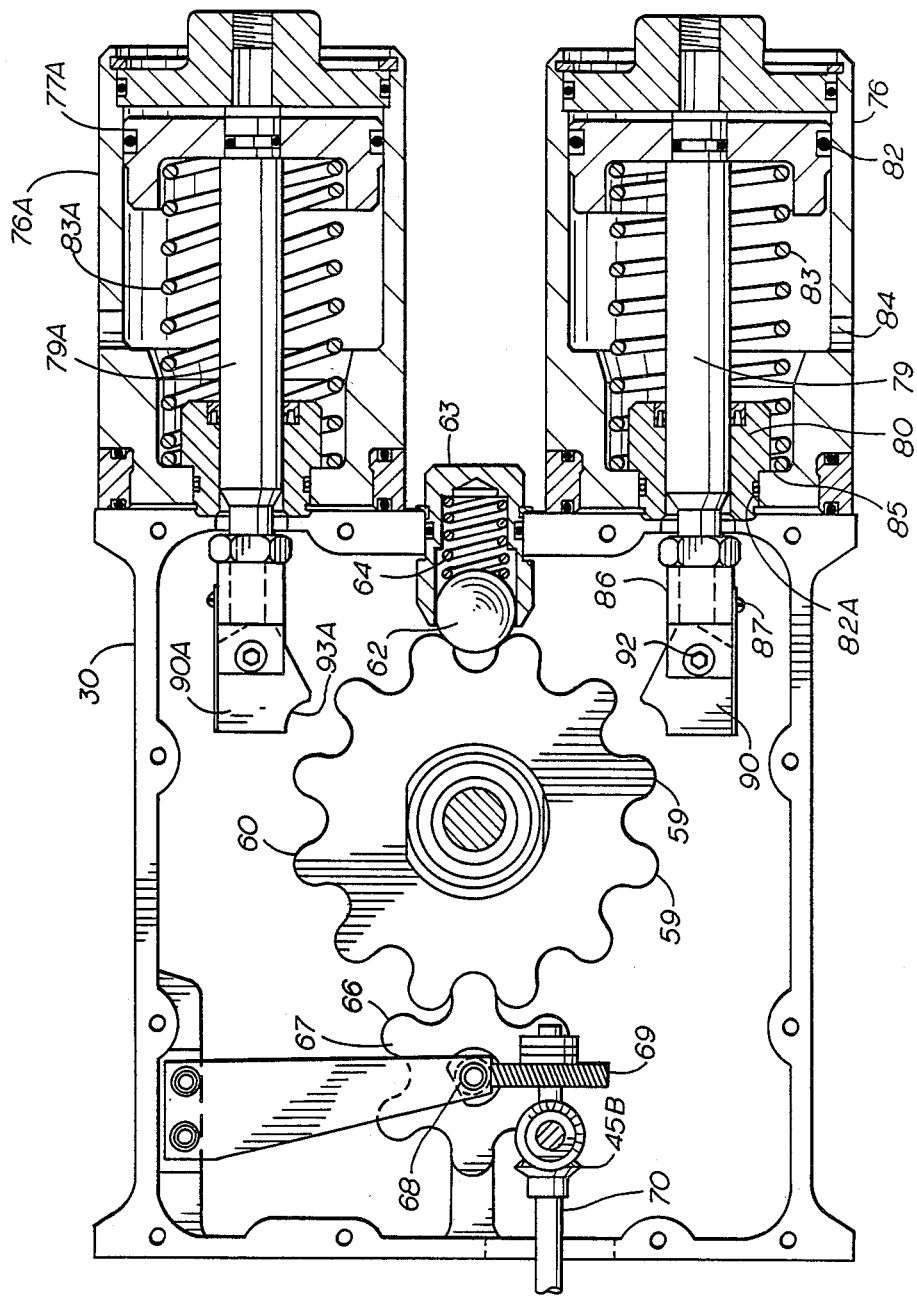
FIG. 3 is a sectional view through a pair of piston-cylinder assemblies which are adapted to selectively drive a ratchet gear in a gear-drive mechanism for driving the stem of the actuator to adjust the position of the choke element to either either increase or decrease the opening of the choke.

The piston and cylinder assembly for effecting increases in the opening of the choke comprises a cylinder 76 with a piston 77 mounted for sliding reciprocating motion therein. A centrally disposed inlet opening 78 is provided at one end of the cylinder 76 and receives the conduit 74 connected in fluid communication with the cylinder 76. A piston rod 79 is fixed to the piston 77 in coaxial relation therewith and extends through the bore of a tubular spring guide 80 fitted in an opening 81 in the end of the cylinder remote from the fluid inlet 78. A helical compression spring 83 is sleeved about the piston rod 79 with one end abutting the piston 77 on the side thereof which is opposite the fluid-pressure receiving side of the piston. The other end of the spring 83 abuts an annular shoulder 85 provided in the interior of the cylinder housing by its inner end wall of the cylinder 76 in surrounding relation to the spring guide 80. The spring 83 is adapted to be compressed upon the application of fluid pressure to the piston 77 when communicated to the cylinder 76 via the conduit 74. Upon removal of fluid pressure from the piston surface 81, the spring 83 returns the piston 77 and piston rod 79 to their positions as shown in FIG. 3. A sealing o-ring 82 fitted in a circumferential groove about the piston 77 establishes a seal between the piston and the interior wall 76a of the cylinder 76. An openin 84 through the cylindrical wall of the cylinder 76 in the spring-engaged side of the piston 77 allows for a free movement of the piston in the cylinder 76.

Figure 4:
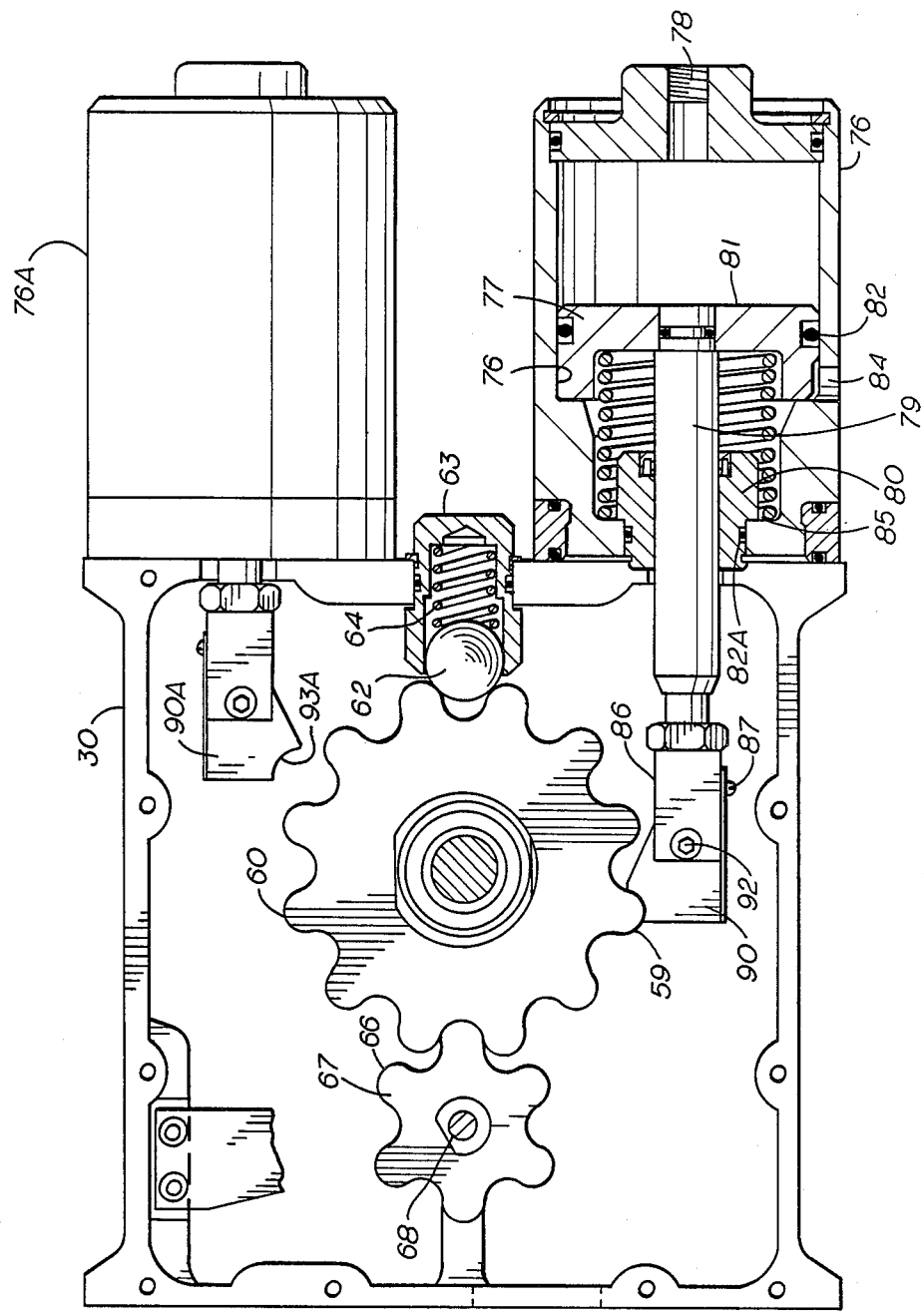
FIG. 4 is a view similar to FIG. 3, but showing operation of one of the piston-cylinder assemblies of the invention in driving engagement with the circular tooth ratchet drive gear of the invention.
Figure 5:
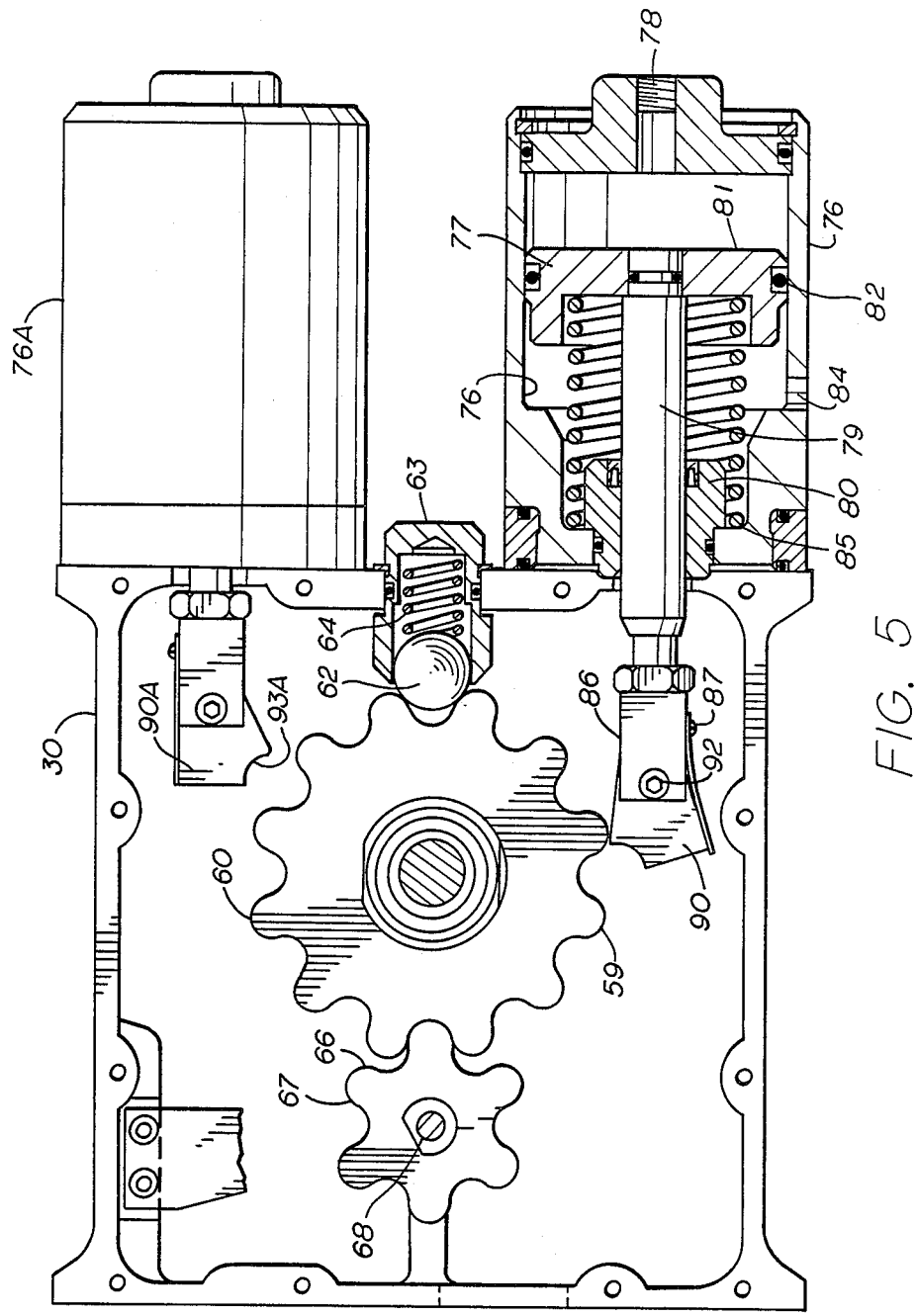
FIG. 5 is a view similar to FIG. 4, but showing the piston stem of FIG. 4 in the process of retracting from engagement with the circular tooth drive gear; and, FIG. 6 is a schematic block diagram of the electromechanical control system of the invention.

At the end of the piston rod which extends from the cylinder 76, it is fitted with a clevis 86 secured to the piston rod 78 by a head screw 87. A flat cam element or pawl 90 is also fastened to the end of the piston or by means of a leaf spring 91 which is secured to a flat surface of the cam pawl 90 and to the clevis 96 by a shoulder screw 92. The pawl 90 is provided with a camming surface 93 having a concave circular configuration throughout its major extent for a full contract engagement with the circular configured surface of a tooth 59 of the ratchet drive gear 60, as shown in FIG. 4, whenever the piston 77 is driven by fluid pressure in the cylinder 76. Whenever fluid pressure is removed, a flat surface 94 of the pawl 90 engages another tooth of the ratchet gear 60 as the piston and piston rod retract to their original positions as shown in FIG. 3. The leaf spring 91 is flexed by the force applied by the gear tooth to the cam surface 94 to where the pawl 90 is pivoted in a direction away from the ratchet gear 60 to allow full retraction of the piston rod 78 and piston 77.

The amount of rotation of the ratchet gear 60 is equal to the angle of arc from one gear tooth 59 to the next as measured from the center of the ratchet gear. This angle of rotation is controlled by the releasable lock applied to the ratchet gear by the ball detent 62 as it moves from one valley between a pair of gear teeth 59 to the next. The ball 62 is mounted in the blind bore of a housing 63 and biased outwardly thereof by a coiled spring 64. The ball housing is mounted on the gear box 30 and oriented such that the ball 62 engages the teeth of the gear 60.

There is also a limit applied to the axial thrust of the piston rod 78 by the piston stop 95 formed by an annular shoulder in the interior wall of the cylinder 76 which engages the spring side of the piston 77 at the limit of its pressurized stroke.

It will thus be seen that a pressurized stroke of the piston 77 results in rotation of the gear 60 in the clockwise direction by an amount equal to the angle between gear teeth, which in embodiment shown in FIG. 4, equals 30°. As previously described, this results in an increase in the opening of the choke.

The structure of the piston an cylinder assembly which is disposed in the channel of the system for effecting decreases in choke opening are identical to the structure of the pisto and cylinder assembly described above for effecting increases in choke opening. Since the structure is the same, components of the piston-cylinder assembly for effecting decreases in choke opening will be identified with the same reference numbers but with the subscript A appended thereto. However, to effect decreases in choke opening, the cylinder 76A is attached on the gear box so that the piston rod 79A and pawl 90A are disposed on the side of the ratchet gear opposite that of the piston rod 79 and pawl 90 of the other piston and cylinder assembly. It is also oriented so that its cam surface 93A is adapted to engage a tooth 59A of the ratchet gear 60 during a pressurized stroke of the piston rod 79A and thereby effect a limited counter-clockwise rotation of the ratchet gear 60.

The ratchet gear 60 is fixed to the actuator stem but its teeth 59 are also disposed to cooperatively engage the teeth 66 of a smaller limit switch drive gear 67 which turns a worm 68, an engaged worm gear 69 and a limit switch drive shaft 70. The teeth 66 are also provided with circular curved teeth for cooperative engagement with the teeth 59.

The limit switch drive shaft 70 is equipped with limit switch cams 56, 57 and to the feedback potentiometer 44 for delivering a feedback signal to the drive controller couparater 42.

Also driven by the worm 68 is a bevel gear 45A, the shaft 46 of which drives an indicator pointer 47 of a dial 48 which provides an indication of the percent opening of the choke. The indicator could, of course, provide an indication in degrees or other units as may be desirable. Bevel gear 45B connected to bevel gear 45A also drives limit switch shaft 58.

As shown in FIG. 1, the limit switches and potentiometer are mounted in a switch box housing 49 bolted on one side of the gear box 30.

OPERATION

As initially installed, the choke is set at a desired degree of opening to provide for a desired rate of flow, as for example, half open corresponding to a 12 ma signal from the computer. When an operator wishes to adjust the flow rate, to increase flow, for example, a mechanical input signal to the computer is made which will provide for an increase in the command signal from the processor 40, which for purposes of explanation may be an increase from 12 ma to 16 ma. The command signal from the processor is input to the drive controller 42 which compares the 16 ma command signal with the 12 ma feedback signal from the feedback potentiometer 44. The drive controller generates an amplified difference signal which is delivered to the control channel of the system which effects increases in the choke opening. In the given example, the difference signal is a positive signal which is input to timer 51 and determines the number of pulses in a pulse train emitted by timer 51 in response to the difference signal. The pulse train, a series of "on" and "off" pulses, is delivered over conductor 71 to an input terminal of the solenoid valve 73 which is energized periodically for time periods corresponding to the duration of an "on" pulse of the pulse train. An "on" pulse representing a pulse of electromagnetic energy and the "off" pulse representing an absence of such energy. When energized, the solenoid valve 73 opens a flow path via the conduit 74 to the input port 75 at one end of the cylinder 76. Fluid pressure on the piton 77 therefore drives the piston to compress the piston return spring 83 whereby the stroke of the piston rod rotates the derive gear in clockwise direction through a 30° angle of arc as shown in FIG. 4. Consequently, it will thus be seen that a pressurized 18 stroke of the piston 77 results in rotation of the gear 60 in the clockwise direction by an amount equal to the angle between gear teeth, which in embodiment shown in FIG. 4, equals 30°. As previously described, this results in an increase in the opening of the choke.

The structure of the piston and cylinder assembly which is disposed in the channel of the system for effecting decreases in choke opening are identical to the structure of the piston and cylinder assembly described above for effecting increases in choke opening. Since the structure is the same, components of the piston-cylinder assembly for effecting decreases in choke opening will be identified with the same reference numbers but with the subscript A appended thereto. However, during an "on" pulse which energizes the solenoid, pneumatic pressure is communicated to the cylinder to rotate the drive gear in one step of rotation. During an "off" pulse when the solenoid is de-energized, there is no communication of pressurized fluid to the cylinder and the piston return spring returns the piston to its original position wherein the piston rod and ratchet pawl are retracted from contact with the drive gear to prepare for a subsequent pulse of pressurized fluid and a second step of rotation of the drive gear.

As the ratchet gear rotates in steps, the associated gearing rotates the stem of the feedback potentiometer to increase the feedback signal to the drive controller. When the feedback signal reaches 16 ma, it is equal to the command signal from the processor whereby there is cessation of pulses from the drive controller. The choke has therefore reached its desired position.

While operation of the system has been described with respect to an adjustment which increases the opening of the choke, it operates in similar manner for effecting a reduction of the opening of the choke. In such case, the command signal from the processor is smaller than the system feedback signal such that a negative difference signal is generated by the drive controller. This negative difference signal is applied to timer which delivers a train of on-off pulses to the solenoid, which is successively energized by each of the "on" pulses of the pulse train. The repeated energization of the solenoid results in the delivery of pulses of pressurized fluid to the cylinder, each pulse of pressurized fluid driving the piston against its return spring and effecting a rotation of the drive gear in the counterclockwise direction by an angle corresponding to 30° of arc. Each "off" pulse allows the piston rod and ratchet pawl to retract from engagement with the drive gear to their original position as appears in FIG. 3. When the feedback signal equals the command signal, pulses cease and there is no further rotation of the drive gear as the choke has reached its desired position.

For manual override capability, the actuator assembly is provided with a handwheel 45 and associated stem segment 46 which is selectively engageable with the actuator stem 24A for rotation of the same to either increase or decrease the opening of the choke. The handwheel stem 46 extends into the opening 96 provided by a boss 97 centrally located in the cover plate 31 bolted to the gear box housing 30. The boss includes an outward facing internal annular shoulder 98a. The handwheel and its stem are biased outwardly of the gear box housing by means of a helically coiled spring 99 to a position where the handwheel stem is disengaged from the actuator stem. The spring is sleeved about the handwheel stem with one end of the spring in abutting engagement with the internal shoulder 98a and its other end with an inward facing annular shoulder 98b provided by a circumferential radial flange 100 on the handwheel stem. The inner end of the handwheel stem is notched to provide a lug 101 which is adapted to fit into a correspondingly configured recess 102 provided in the adjacent end of the actuator stem segment 24a. The opening through the cover plate is provided with a bushing 103 which receives the handwheel stem adapted for axial movement and rotary movement therein. When disengaged from the actuator stem, the outward facing shoulding 104 provided by the stem flange engages the flanged end of the boss and is retained thereby. When it is desired to manually override the system, the handwheel is pressed towards the gear box housing to where the lug end of the stem engages the adjacent end of the actuator stem. It is then rotated to where the lug is fitted into the accommodating recess in the end of the actuator stem. Further clockwise rotation of the handwheel will rotate and axially move the actuator stem to increase the choke opening whereas counterclockwise rotation will decrease the choke opening.

To initiate manual operation by means of the handwheel, a selector switch (not shown) must be provided to cut-off power supply to the drive controller. When the selector switch is in the "auto" position for automatic operation of the control system, an attempt at "manual" operation will result in a jerk at the handwheel due to an unbalancing signal from the feedback potentiometer to the drive controller, which will activate timer and solenoid circuits and operate the stepper actuator in the opposite direction.

It will therefore be seen that a new and improved stepping actuator and positioning control system is described herein which is admirably suited for flow rate control of high pressure flowlines. For any set position of the choke, the signal from the processor is in balance with the feedback signal from the feedback potentiometer. Should there be a loss of command signal, the resulting imbalance of the command and feedback signals will activate the control system to drive the choke to a minimum signal position or a "fail-close" condition. Should there be a loss of power to the drive controller and the timers, the choke will remain in its last position regardless of the value of the command signal since there is an absence of pulses to the solenoid valves for effecting operation of the actuator drive pistons and ratchet gearing.

The stepping actuator described herein may therefore be easily operated by remote control from the computer. It is operable with minimum backlash and minimal torque and, therefore, provides for great precision.

The external indicator is designed to indicate the percent open for the choke, but it could, of course, be modified to indicate other parameters, such as degrees of movement of the choke element.

It is also to be understood that the foregoing description of a preferred embodiment of the invention has been presented for purposes of explanation and description and is not intended to limit the invention to the precise form disclosed. For example, the source of command signals which in the preferred embodiment comprises a computer and command signal processor, could be replaced by a plurality of d.c. voltage and current sources which might be selectively connected to the drive controller for delivering a specific command signal thereto. The fluid pressure source for activating the piston-cylinder assemblies might be hydraulic or pneumatic. While specifically described with respect to a choke device and choke of particular configuration, it could also be applied to other devices such as a valve element having different configurations. While the actuator stem is showing in segments, it could, of course, be a single segment integral with the choke element. It is to be appreciated therefore that changes may be made by those skilled in the art without departing from the spirit of the invention.

I claim:

1. An actuating device for automatic and precise positioning control of a choke element in a choke housing installed in a high pressure flowline wherein said choke device is provided with an inlet port, an outlet port communicating with the inlet port, a choke element mounted in the flow path between the inlet and outlet ports to control the rate of flow therethrough, and a stem entry port aligned with said outlet port, said actuating device comprising:

an actuator housing assembly;

an actuator stem mounted to extend from said housing assembly;

a tubular adapter clamped to the choke housing at said stem entry port in alignment with said entry and outlet ports;

means munting the actuator housing assembly to the adapter with the actuator stem disposed through the adapter and in attached aligned engagement with the choke element, said actuator stem having an externally threaded section and said adapter having internal threads cooperatively engaged with the externally threaded section of the actuator stem whereby axial rotation of the actuator stem produces axial movement of the actuator stem and choke element in a direction to open or close the choke in accordance with clockwise or counterclockwise rotation of the actuator stem; and an electro-mechanical control means operatively associated with said actuator stem for automatically and remotely controlling the direction and degree of axial rotation of the actuator stem for precisely controlling the positioning of the choke element and the opening of the choke, said electro-mechanical control means includeing means for generating an electrical command signal of selected current magnitude in a predetermined range of magnitudes;

means for generating an electrical feedback signal indicative of actual choke element position;

drive controller means for comparing the command signal and the feedback signal and generating a difference signal corresponding to a difference in magnitudes between the command signal and the feedback signal;

means for generating a train of electrical pulses of a number proportional to the magnitude of the difference signal;

means operatively associated with said pulse train generating means for delivering pulses of fluid pressure from a connectable source of fluid pressure to either of a pair of piston-cylinder assemblies in accordance with the positive or negative character of said difference signal and of a number corresponding to the number of electrical pulses in said pulse train;

each piston-cylinder assembly including a piston and piston rod extending from said cylinder and adapted to be activated by each of the fluid pressure pulses applied thereto from a first retracted position corresponding to an absence of fluid pressure applied to the piston and a second extended position corresponding to an application of a fluid pressure pulse to the piston;

spring means for returning the piston to its retracted position upon an absence of a pulse of fluid pressure; and a pawl affixed to the end of the piston rod external of said cylinder;

gear drive means comprising a ratchet drive gear mounted in said actuator housing in proximity to said piston-cylinder assemblies and adapted to be engaged by a pawl of said piston rods when a piston rod has been actuated to its extended position and driven a limited angle of rotary movement by said pawl;

one of said piston-cylinder assemblies being disposed to rotate the drive gear in steps of clockwise rotary movement corresponding to the number of pulses in said pulse train and the other of said piston-cylinder assemblies being disposed to rotate the drive gear in steps of counterclockwise rotary movement corresponding to the number of pulses in said pulse train whereby said choke element is moved in corresponding increment steps of axial movement to increase or decrease the opening of the choke.

2. An actuating device for automatic and precise positioning of a choke element as described in claim 1 further including means operatively associated with said actuator stem for effecting manual override of the electromechanical control system to impart selected degrees of clockwise or counterclockwise rotary movement of the actuator stem and corresponding increments of axial movement of the choke element to increase or decrease the opening of the choke.

3. An actuating device for automatic and precise positioning of a choke element as described in claim 1 wherein said ratchet drive gear is provided with gear teeth of semicircular convex arcuate configuration and concave semicircular arcuate surfaces between said teeth and the pawl of each piston rod is provided with a concave camming surface of conforming arcuate configuration to the gear teeth whereby each said pawl is adapted for positive engagement with one of said gear teeth.

4. An actuating device for automatic and precise positioning of a choke element as described in claim 3 further including a pair of limit switches, a limit switch drive gear and a pair of cams operatively associated with said limit switch drive gear for operating said limit switches to stop the movement of said piston rods at their respective extended positions.

5. An actuating device for automatic and precise positioning of a choke element as described in claim 3 further including indicator means operatively associated with said ratchet drive gear for providing a visible indication of the percent of opening of said choke.

* * * * *